United States Patent
Perrault et al.

(10) Patent No.: US 10,663,931 B2
(45) Date of Patent: May 26, 2020

(54) PROCESS VARIABLE TRANSMITTER WITH DUAL COMPARTMENT HOUSING

(71) Applicant: Rosemount Inc., Chanhassen, MN (US)

(72) Inventors: Aaron Andrew Perrault, Shakopee, MN (US); Dirk Willy Bauschke, Shakopee, MN (US); Loren Michael Engelstad, Norwood, MN (US)

(73) Assignee: Rosemount Inc., Shakopee, MN (US)

( * ) Notice: Subject to any disclaimer, the term of this patent is extended or adjusted under 35 U.S.C. 154(b) by 762 days.

(21) Appl. No.: 14/035,019

(22) Filed: Sep. 24, 2013

(65) Prior Publication Data
US 2015/0088277 A1   Mar. 26, 2015

(51) Int. Cl.
*G05B 13/02* (2006.01)
*G01D 11/24* (2006.01)
*B29C 45/26* (2006.01)

(52) U.S. Cl.
CPC .............. *G05B 13/02* (2013.01); *B29C 45/26* (2013.01); *G01D 11/245* (2013.01)

(58) Field of Classification Search
CPC combination set(s) only.
See application file for complete search history.

(56) References Cited

U.S. PATENT DOCUMENTS

| | | |
|---|---|---|
| 3,247,719 A | 4/1966 | Chelner ........................ 73/420 |
| 4,623,266 A | 11/1986 | Kielb |
| 4,958,938 A | 9/1990 | Schwartz et al. ............ 374/208 |
| 5,302,934 A * | 4/1994 | Hart ........................ G01K 7/22 338/22 R |
| 5,353,200 A | 10/1994 | Bodin et al. .................. 361/816 |
| 5,451,939 A | 9/1995 | Price ........................ 340/870.31 |
| 5,483,743 A | 1/1996 | Armogan ........................ 29/883 |
| 5,498,079 A | 3/1996 | Price |
| 5,546,804 A | 8/1996 | Johnson et al. ................. 73/431 |

(Continued)

FOREIGN PATENT DOCUMENTS

| CN | 2170506 Y | 6/1994 |
|---|---|---|
| CN | 20167398 Y | 6/1994 |

(Continued)

OTHER PUBLICATIONS

Notification of Transmittal of the International Search Report and the Written Opinion of the International Searching Authority for PCT/US2012/043705, dated Apr. 23, 2014.

(Continued)

*Primary Examiner* — Carlos R Ortiz Rodriguez
(74) *Attorney, Agent, or Firm* — Westman, Champlin & Koehler, P.A.

(57) ABSTRACT

A process variable transmitter for use in an industrial control or monitoring process is provided and includes a housing with a cavity formed therein. The housing includes an integrated terminal block which defines first and second compartments in the cavity. The transmitter further includes a process variable sensor configured to sense a process variable of the industrial process. Measurement circuitry is carried in the first compartment and configured to receive a process variable signal from the process variable sensor and provide an output. An electrical connection is carried on the integrated terminal block in the second compartment and is electrically coupled to the output of the measurement circuitry.

15 Claims, 4 Drawing Sheets

(56) References Cited

U.S. PATENT DOCUMENTS

| | | | |
|---|---|---|---|
| 5,606,513 A | 2/1997 | Louwagie | 364/510 |
| 5,656,782 A | 8/1997 | Powell, II et al. | 73/756 |
| 5,665,899 A | 9/1997 | Willcox | 73/1.63 |
| 5,727,110 A | 3/1998 | Smith et al. | |
| 5,753,797 A | 5/1998 | Forster et al. | |
| 5,907,112 A | 5/1999 | Queyquep | |
| 5,954,526 A | 9/1999 | Smith | 439/136 |
| 5,983,619 A | 9/1999 | Dogre Cuevas | 374/141 |
| 6,062,095 A | 5/2000 | Mulrooney et al. | 73/866.5 |
| 6,146,188 A | 11/2000 | Snyder | |
| 6,356,191 B1 | 3/2002 | Kirkpatrick et al. | |
| 6,484,107 B1 | 11/2002 | Roper et al. | 702/50 |
| 6,546,805 B2 | 4/2003 | Fandrey et al. | 73/753 |
| 6,790,050 B1 | 9/2004 | Roth-Stielow et al. | 439/76.2 |
| 7,164,262 B2 | 1/2007 | Zacay | 324/115 |
| 7,190,053 B2 | 3/2007 | Orth et al. | |
| 7,321,833 B2 | 1/2008 | DuHack et al. | |
| 7,421,258 B2 | 9/2008 | Bauschke et al. | 455/128 |
| 7,476,848 B2 * | 1/2009 | Argast | G01D 11/245 250/221 |
| 7,503,784 B2 | 3/2009 | Osborne et al. | |
| 7,550,826 B2 | 6/2009 | Orth et al. | |
| 7,722,362 B2 * | 5/2010 | Frake | B29C 43/18 439/76.1 |
| 7,984,652 B2 | 7/2011 | Hausler | 73/756 |
| 8,128,284 B2 | 3/2012 | Martensson | 374/208 |
| 8,217,782 B2 | 7/2012 | Nelson et al. | 340/539.1 |
| 8,223,478 B2 | 7/2012 | Perrault et al. | |
| 8,290,721 B2 | 10/2012 | Wehrs et al. | 702/45 |
| 8,334,788 B2 | 12/2012 | Hausler et al. | 340/870.02 |
| 8,408,787 B2 | 4/2013 | Rud et al. | |
| 8,736,784 B2 | 5/2014 | Hausler et al. | 349/58 |
| 9,030,190 B2 | 5/2015 | Matt | 324/156 |
| 9,479,201 B2 | 10/2016 | Larson et al. | |
| 9,907,563 B2 | 3/2018 | Germain et al. | |
| 2002/0011115 A1 | 1/2002 | Frick | 73/718 |
| 2002/0069700 A1 | 6/2002 | Dirmeyer | 73/431 |
| 2002/0115333 A1 | 8/2002 | Self | 439/374 |
| 2004/0051521 A1 | 3/2004 | Ishihara | 324/207.16 |
| 2007/0191970 A1 | 8/2007 | Orth et al. | 700/17 |
| 2007/0201192 A1 | 8/2007 | McGuire et al. | 361/600 |
| 2009/0257722 A1 | 10/2009 | Fisher et al. | |
| 2011/0058313 A1 | 3/2011 | Hausler et al. | 361/679.01 |
| 2011/0215944 A1 | 9/2011 | Hausler et al. | |
| 2011/0317390 A1 | 12/2011 | Moser et al. | 361/807 |
| 2012/0063065 A1 | 3/2012 | Perrault et al. | 361/679.01 |
| 2012/0147608 A1 | 6/2012 | Kawagoe et al. | |
| 2013/0083824 A1 | 4/2013 | Bronczyk et al. | |
| 2013/0126519 A1 | 5/2013 | Arnal Valero et al. | |
| 2013/0344818 A1 | 12/2013 | McGuire et al. | 455/73 |
| 2014/0095095 A1 | 4/2014 | Rud et al. | 702/69 |
| 2014/0269829 A1 | 9/2014 | Bronczyk et al. | 374/152 |
| 2015/0280754 A1 | 10/2015 | Larson et al. | |
| 2016/0093997 A1 | 3/2016 | Eriksen et al. | |
| 2016/0381822 A1 | 12/2016 | Hausler | |

FOREIGN PATENT DOCUMENTS

| | | |
|---|---|---|
| CN | 2241874 | 12/1996 |
| CN | 1155329 A | 7/1997 |
| CN | 1191602 | 8/1998 |
| CN | 1898534 A | 1/2007 |
| CN | 2857251 Y | 1/2007 |
| CN | 101260957 | 9/2008 |
| CN | 201141442 | 10/2008 |
| CN | 201204543 | 3/2009 |
| CN | 101776491 A | 7/2010 |
| CN | 102365528 | 2/2012 |
| CN | 102483366 | 5/2012 |
| CN | 202562633 U | 11/2012 |
| CN | 203053467 | 7/2013 |
| CN | 203148583 | 8/2013 |
| CN | 203 385 492 U | 1/2014 |
| CN | 204165564 | 2/2015 |
| CN | 204255566 | 4/2015 |
| CN | 205719038 | 11/2016 |
| DE | 10 2005 046 331 | 3/2007 |
| DE | 10 2010 090 924 | 12/2011 |
| EP | 1 897 365 | 10/2008 |
| EP | 2 772 729 A2 | 2/2014 |
| JP | 64-48625 | 3/1989 |
| JP | H0148625 U | 3/1989 |
| JP | 4-505662 | 10/1992 |
| JP | H04505662 A | 10/1992 |
| JP | H0660919 | 3/1994 |
| JP | H0660919 A | 3/1994 |
| JP | H09-127066 | 5/1997 |
| JP | H1167300 A | 3/1999 |
| JP | 2000-509484 | 7/2000 |
| JP | 2000509484 A | 7/2000 |
| JP | 2008-514012 | 5/2008 |
| JP | 2011-146436 | 7/2011 |

OTHER PUBLICATIONS

Office Action from U.S. Appl. No. 13/251,726, dated Apr. 24, 2014.
Office Action from Chinese Application No. 201110443913.7, dated Mar. 26, 2014.
Communication Under Rules 161(1) and 126 EPC from European Application No. 12743559.2, dated Jul. 4, 2014.
Office Action from Chinese Application No. 201110443913.7, dated Nov. 4, 2014.
Notification of Transmittal of the International Search Report and the Written Opinion of the International Searching Authority for PCT/US2014/049710, dated Oct. 28, 2014.
Notification of Transmittal of the International Search Report and the Written Opinion of the International Searching Authority for PCT/US2014/043123, dated Nov. 20, 2014.
Invitation to Pay Additional Fee from corresponding International Patent Application No. PCT/US12/043705 dated May 24, 2013. 9 pgs.
Rosemount "Rosemount 3144P Temperature Transmitter," Mar. 2008.
Office Action dated Mar. 29, 2013 in U.S. Appl. No. 13/251,726, filed Oct. 3, 2011. 13 pages.
Final Office Action dated Nov. 14, 2013 in U.S. Appl. No. 13/251,726, filed Oct. 3, 2011. 15 pgs.
Wika: "Digital Temperature Transmitter," Jul. 2008. 7 pgs.
First Office Action from corresponding Chinese Patent Appln. No. 201120555381.1 dated Jun. 6, 2012. 3 pgs.
Product Data Sheet. Rosemount 644 Temperature Transmitter. Oct. 2010 by Emerson Process Management. 28 pgs.
Product Data Sheet 3.80. TDZ&THZ Smart HART® Temperature Transmitters. Apr. 2005 by Moore Industries. 16 pgs.
Notification of Transmittal of the International Search Report and the Written Opinion of the International Searching Authority for PCT/CN2013/084662, dated Jun. 30, 2014.
Notification of Transmittal of the International Search Report and the Written Opinion of the International Searching Authority for PCT/US2015*014560, dated May 19, 2015.
Office Action from U.S. Appl. No. 14/225,775, dated Nov. 27, 2015.
EP Communication from European Patent Application No. 14737130.6, dated May 4, 2016.
Office Action from Chinese Patent Application No. 201410054296.5, dated May 5, 2016.
Office Action from U.S. Appl. No. 14/225,775, dated Apr. 12, 2016.
Office Action from U.S. Appl. No. 14/237,476, dated May 31, 2016.
EP Communication from European Patent Application No. 138941604, dated May 9, 2016.
Office Action from U.S. Appl. No. 14/036,787, dated Mar. 23, 2016.
Communication pursuant to Rules 161(1) and 162 EPC for European Patent Application No. 14755740.9-1568, dated May 4, 2016, 2 pages.
Office Action from Chinese Patent Application No. 201410054296.5, dated Dec. 29, 2016.
Office Action from Chinese Patent Application No. 201410186900.X, dated Oct. 19, 2016.
Office Action from U.S. Appl. No. 14/237,476, dated Dec. 29, 2016.

(56) References Cited

OTHER PUBLICATIONS

Office Action from Canadian Patent Application No. 2,923,141, dated Dec. 12, 2016.
Notification of Transmittal of the International Search Report and the Written Opinion of the International Searching Authority from PCT/US2015/035421, dated Sep. 21, 2016.
Rosemount "Rosemount 3144P Temperature Transmitter," Nov. 2010.
Office Action from Japanese Patent Application No. 2016-518191, dated Mar. 8, 2017.
Communication from European Patent Application No. 13894160.4, dated Apr. 13, 2017.
Office Action from Russian Patent Application No. 2016116897, dated May 30, 2017.
Office Action from U.S. Appl. No. 14/753,119, dated Jul. 10, 2017.
Office Action from Japanese Patent Application No. 2016-54438, dated Apr. 19, 2017.
Office Action from Chinese Patent Application No. 201410054296.5, dated Jun. 20, 2017.
Office Action from Japanese Patent Application No. 2016-544318, dated Aug. 9, 2017, 6 pages.
Office Action from European Patent Application No. 14 737 130.6-1568, dated Jul. 9, 2017, 13 pages.
Rejection Decision from Chinese Patent Application No. 201410054296.5, dated Sep. 28, 2017, 23 pages.
Final Office Action from U.S. Appl. No. 14/753,119, dated Jan. 8, 2018.
Office Action from Japanese Patent Application No. 2016-518191, dated Nov. 29, 2017.
Communication pursuant to Rules 161(1) and 162 EPC for European Patent Application No. 16729166.5, dated Feb. 6, 2018, 3 pages.
Office Action from Chinese Patent Application No. 201510848995.1, dated Mar. 16, 2018.
Office Action from Chinese Patent Application No. 201711360421.5, dated Oct. 8, 2019.

\* cited by examiner

PROCESS VARIABLE TRANSMITTER WITH DUAL COMPARTMENT HOUSING

BACKGROUND

The present invention relates to industrial process control or monitoring systems. In particular, the present invention relates to process variable transmitters configured to sense process variables in such systems.

Process variable transmitters are used in industrial process control environments. Such transmitters couple to a process fluid to provide measurements related to the process. Process variable transmitters can be configured to monitor one or more process variables associated with fluids in a process plant, such as slurries, liquids, vapors and gasses in chemical, pulp, petroleum, gas, pharmaceutical, food and other fluid processing plants. Example monitored process variables include pressure, temperature, flow, level, pH, conductivity, turbidity, density, concentration, chemical composition or other properties of fluids. Typically, the process variable transmitters are located at remote locations, usually in a field, and send information to a centralized location such as a control room. Process variable transmitters sense process variables in a variety of applications, including oil and gas refineries, chemical storage tank farms, or chemical processing plants. In many instances, this requires the process variable transmitters to be located in a harsh environment.

Some types of process variable transmitters include a housing divided into two separate compartments. One compartment contains electrical circuitry and the other compartment contains a terminal block used to couple to a process control loop. One such configuration is shown in U.S. Pat. No. 5,546,804.

SUMMARY

A process variable transmitter for use in an industrial control or monitoring process is provided and includes a housing with a cavity formed therein. The housing includes an integrated terminal block which defines first and second compartments in the cavity. The transmitter further includes a process variable sensor configured to sense a process variable of the industrial process. Measurement circuitry is carried in the first compartment and configured to receive a process variable signal from the process variable sensor and provide an output. An electrical connection is carried on the integrated terminal block in the second compartment and is electrically coupled to the output of the measurement circuitry.

DETAILED DESCRIPTION OF ILLUSTRATIVE EMBODIMENTS

The present invention provides a process variable transmitter for use in an industrial process, including a housing divided into two compartments. The two compartments are defined by an integrated terminal block which seals measurement circuitry in a first compartment and provides a seal between the two compartments.

Figure 1:
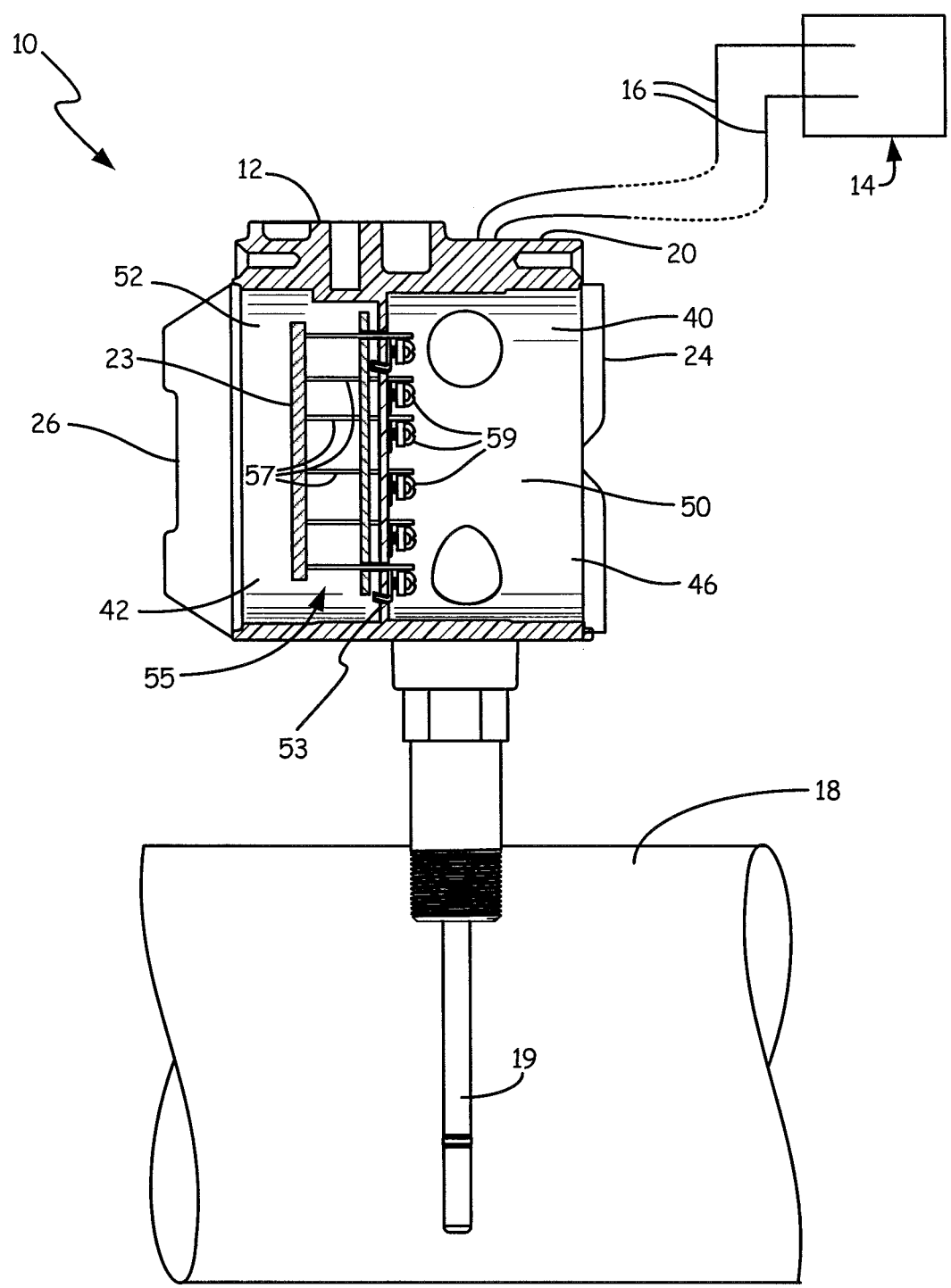
FIG. 1 is a diagram showing a cross-sectional view of a process variable transmitter including a polymer wall and a pin assembly in accordance with one embodiment of the present invention.

FIG. 1 is a simplified diagram showing an industrial process control or monitoring system 10 for use in monitoring or controlling a process fluid in an industrial process. Typically, a process variable transmitter 12 is located at a remote location in a field, and transmits a sensed process variable back to a centrally-located control room 14. Various techniques can be used for transmitting the process variable, including both wired and wireless communications. One common wired communication technique uses what is known as a two-wire process control loop 16 in which a single pair of wires is used to both carry information as well as provide power to the transmitter 12. One technique for transmitting information is by controlling the current level through the process control loop 16 between 4 mA and 20 mA. The value of the current within the 4-20 mA range can be mapped to corresponding values of the process variable. Example digital communication protocols include HART® (a hybrid physical layer consisting of digital communication signals superimposed on a standard 4-20 mA analog signal), FOUNDATION™ Fieldbus (an all-digital communication protocol promulgated by the Instrument Society of America in 1992), Profibus communication protocol, or others. Wireless protocols, such as radio-frequency communication techniques including WirelessHART®, may also be implemented.

Pursuant to one embodiment, process variable transmitter 12 includes a probe 19 which extends into process piping 18 and is configured to measure a process variable of a process fluid in the process piping 18. Example process variables include pressure, temperature, flow, level, pH, conductivity, turbidity, density, concentration, chemical composition, etc. Process variable transmitter 12 includes a housing 20 having a cavity 40 formed therein, which extends between a first opening 42 and a second opening 46. The first opening 42 preferably has a cylindrical shape such that an end cap 26 can be threadably coupled to the housing 20. A similar end cap 24 seals second compartment opening 46.

Single-compartment process variable transmitters are known. Such transmitters typically have an electronics module carried on a transmitter puck placed inside the housing which includes terminal connections. However, in a single compartment configuration, the interior electronics and other delicate components are exposed to the process environment when the cover is removed. Therefore, some prior art configurations use a dual compartment configuration in which the transmitter housing is divided into a first compartment and a second compartment by a bulkhead. An opening in the bulkhead is used to route wiring between the two compartments.

As shown in FIG. 1, transmitter 12 includes a polymer wall 53 configured to provide an environmental seal which defines a first compartment 52 and a second compartment 50 in the cavity 40. Polymer wall 53 is formed as integrally (single piece) with housing 20. More specifically, wall 53 is fabricated in a single molding step with housing 20 such that there is no seam between wall 53 and housing 20. Measurement circuitry 23 is carried on the polymer wall 53 in the first compartment 52. Measurement circuitry 23 is configured to receive a process variable signal from a process variable sensor and provide an output.

Polymer wall 53 provides a seal between the first compartment 52 and the second compartment 50 in the cavity 40 formed in the housing 20. As shown in FIG. 1, transmitter 12 includes a pin assembly 55 which include a terminal pins 57 connected to terminal screw assemblies 59. Terminal pins 57 are carried in the second compartment 50 and are configured to electrically couple to measurement circuitry 23. Terminal pins 57 are molded into the polymer wall 53 using known molding or other techniques and extend through the polymer wall 53, and are joined to the measurement circuitry 22 in the first compartment 52 using known soldering or other techniques.

Figure 2:
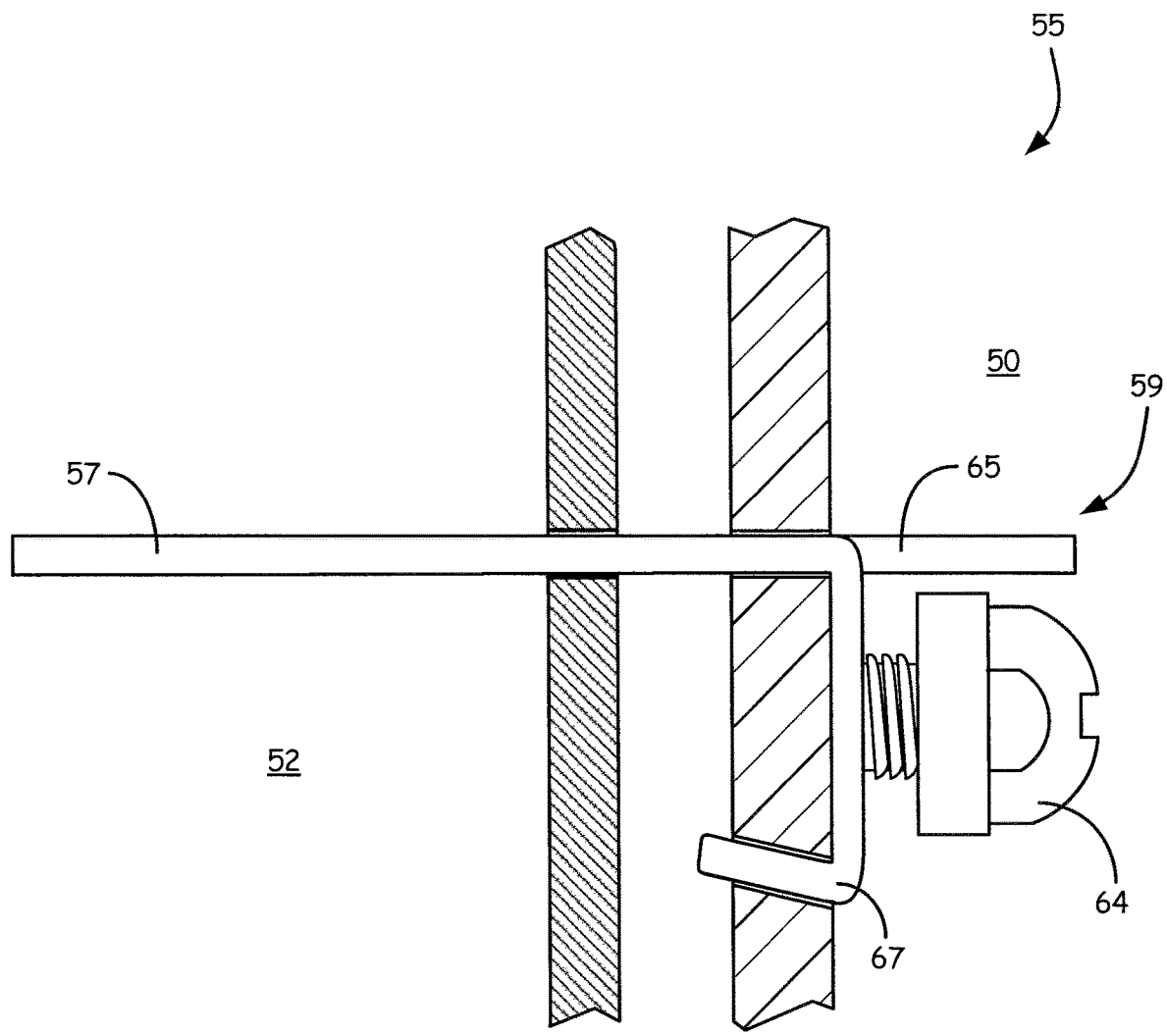
FIG. 2 is an enlarged view of a pin assembly of the process variable transmitter of FIG. 1 in accordance with one embodiment of the present invention.

FIG. 2 shows a cross-sectional view of a portion of pin assembly 55. Pin assembly 55 includes a terminal pin 57. At a first end, terminal pin 57 extends laterally into the second compartment 50 to terminal screw assembly 59. Terminal pin 57 is molded into polymer wall 53 and extends through the polymer wall 53 so as to be joined to measurement circuitry 23 via soldering or other joining techniques. Terminal screw assemblies 59 are configured to accept electrical connections. Terminal screw assembly 59 preferably includes a terminal screw 64, retainer bracket 65 and a prong 67 which extends into a corresponding cavity in polymer wall 53 so as to secure the terminal screw assemblies 59 to wall 53. As shown in FIG. 2, prong 67 extends completely through polymer wall 53 and can be angled so as to securely fix the terminal screw assemblies 59 to the wall 53. Prong 67 is joined to terminal pin 57 using any suitable joining technique and may be fabricated as a single element. Pin assembly 57 is typically formed by a stamped piece comprising elements 57, 65, and screw 64.

Figure 3:
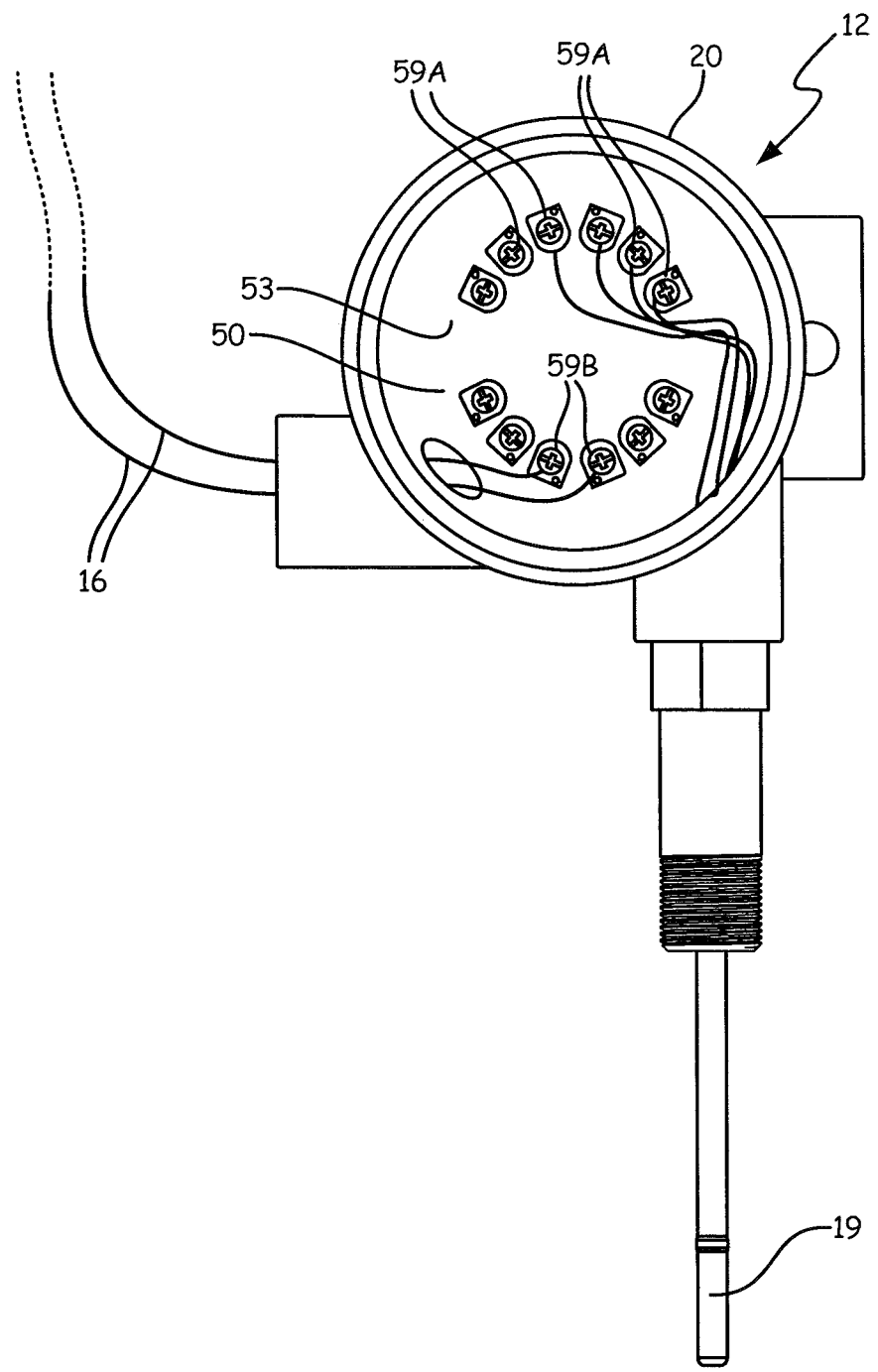
FIG. 3 is a front plan view of the transmitter of FIG. 1 showing terminal block connections.

FIG. 3 is a front plan view of transmitter 12 showing terminal assemblies 59A,B located in compartment 50. Control loop terminal assemblies 59B are carried on a terminal block side of the polymer wall 53 and are configured to couple to process control loop 16. This terminal block side of polymer wall 53 also carries sensor terminal assemblies 59A configured to couple to a process variable sensor 19 such as temperature sensor. In the configuration shown in FIG. 3, the terminal block side of wall 53 can be accessed in compartment 50 by an operator without exposing measurement circuitry 23 to the process environment.

Figure 4:
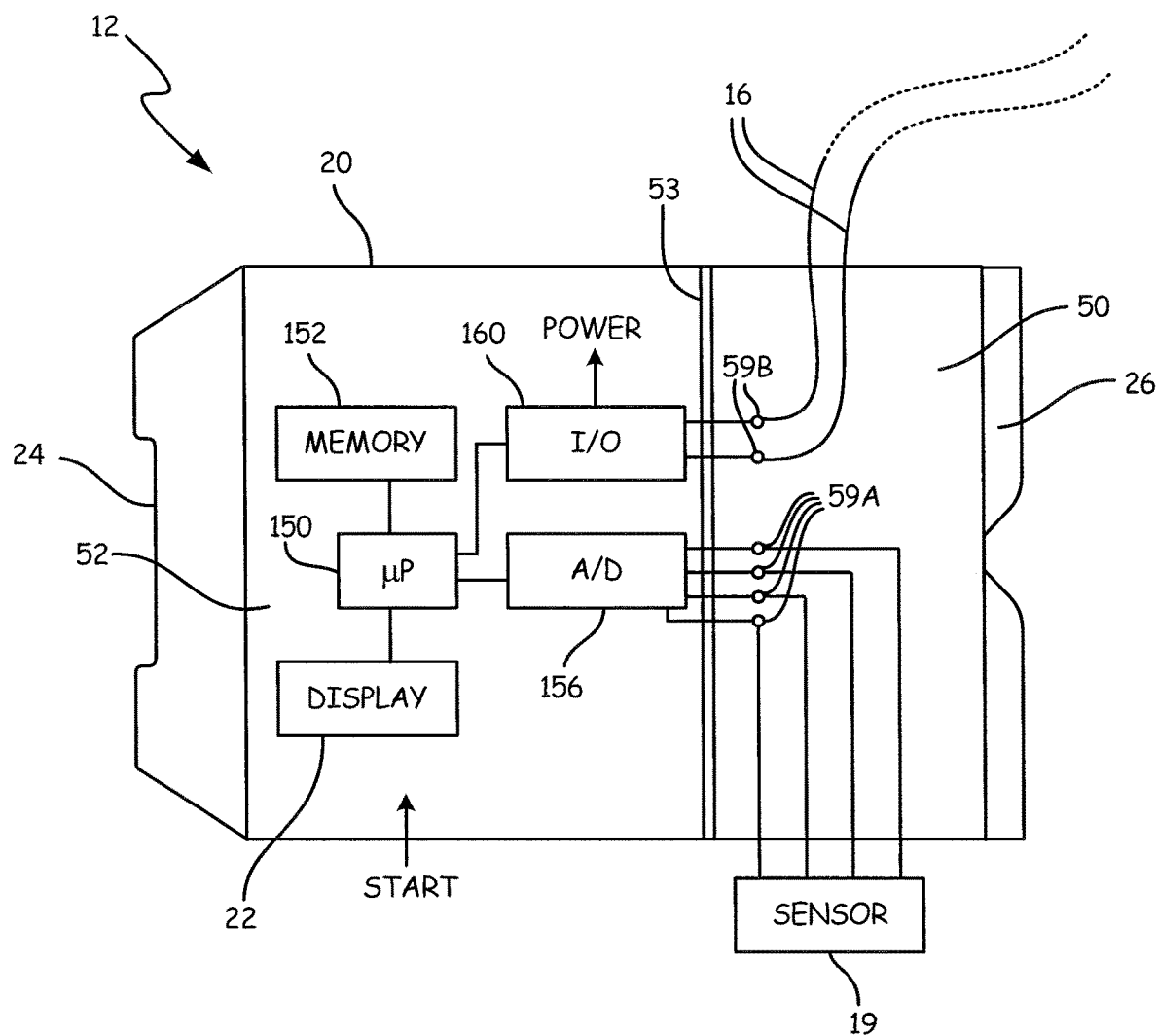
FIG. 4 is a simplified diagram showing electrical circuitry of the transmitter of FIG. 1.

FIG. 4 is a simplified block diagram of process variable transmitter 12 showing measurement circuitry 23 in more detail. As illustrated in FIG. 4, measurement circuitry 23 is positioned in cavity 52 and includes a microprocessor 150 which operates in accordance with instructions carried in a memory 152. Microprocessor 150 couples to a process variable sensor 154 through analog-to-digital converter 156 and sensor terminals 130 positioned in compartment 50. Sensor 154 can be any type of process variable sensor including, for example, a temperature sensor. Microprocessor 150 couples to two-wire process control loop 16 through input/output circuitry 160 and terminals 120 positioned in compartment 50. I/O circuitry 160 is also configured to generate power for powering circuitry 23 with power derived from two-wire process control loop 16. An optional display 22 may also be carried in housing 20 and used to display information locally.

As illustrated schematically in FIG. 4, the polymer wall 53 divides the transmitter housing 20 into cavities 50 and 52. Measurement circuitry 23 is positioned in cavity 52 while terminals 59A,B are positioned in cavity 50. As described above, end cap 26 can be removed from transmitter housing 20 whereby terminals 59A,B and cavity 50 can be accessed by an operator. For example, this can be used to connect the transmitter 12 to the two-wire process control loop 16 as well as used to couple the measurement circuitry 23 to process variable sensor 19.

With the present invention, the housing of a process variable transmitter is fabricated through a single molding step in which a polymer wall 53 provides a terminal block which is formed integrally with the housing. As used herein, the term "integrated terminal block" refers to the polymer wall 53 which divides a cavity in the housing of the transmitter 12 into two separate compartments. The molding which is used to simultaneously form the transmitter housing 20 including the polymer wall 53 may be any appropriate molding technique including injection molding. With this technique, the pins 57 which extend through the terminal block are fabricated integrally with the transmitter housing and extend through the terminal block/polymer wall 53. The pins 57 can be secured in place at the time housing 20 is molded, or at a subsequent time. In contrast to the prior art designs; the polymer wall provides a barrier between cavities 50 and 52 without requiring additional sealing such as o-rings, mechanical connections, etc. Similarly, the pins 57 can be positioned and secured through the polymer wall 53 without requiring additional insertion or sealing steps. This reduces the likelihood of any failure in the seal between the two cavities 50 and 52.

Although the present invention has been described with reference to preferred embodiments, workers skilled in the art will recognize that changes may be made in form and detail without departing from the spirit and scope of the invention. Although a temperature sensor is shown, any type of process variable sensor may be employed. One example polymer is plastic. Any type of terminal may be placed in cavity 50 including sensor terminals, power terminals loop terminals, etc. The invention does not require both of terminals 59A and 59B to be located in cavity 50.

What is claimed is:

1. A process variable transmitter for use in an industrial process, comprising:
a polymer housing having a cavity formed therein which extends between first and second openings, the housing including a polymer wall which forms an integrated terminal block molded integrally as a single piece with the housing and the polymer wall defines a first compartment and a second compartment in the cavity and provides a seal therebetween to seal the first compartment from an environment;
a process variable sensor configured to sense a process variable of the industrial process;
measurement circuitry carried in the first compartment which receives a process variable signal from the process variable sensor and provides an output;
a plurality of terminal pins molded into the polymer wall which are electrically connected in the first compartment to the measurement circuitry and which extend from the first compartment to the second compartment, a portion of the plurality of pins in the first compartment extend from the polymer wall and are exposed in the first compartment and a portion of the plurality of pins in the second compartment extend from the polymer wall and are exposed in the second compartment; and
a plurality of terminal screws assemblies connected to plurality of terminal pins, molded into the polymer wall and having terminal connections carried on the terminal block in the second compartment which are electrically coupled to the measurement circuitry by the plurality of terminal pins, wherein the plurality of terminal pins electronically connect to the process variable sensor in the second compartment.

2. The process variable transmitter of claim 1, including a terminal pin which extends through the polymer wall and provides an electrical connection between the measurement circuitry and a terminal connection.

3. The process variable transmitter of claim 2, wherein a terminal screw assembly is coupled to the terminal pin and disposed in the second compartment.

4. The process variable transmitter of claim 3, wherein the terminal screw assembly includes a prong which extends into the integrated terminal block to thereby secure the terminal screw assembly to the integrated terminal block.

5. The process variable transmitter of claim 1, wherein the terminal connectors provide an electrical connection to the process variable sensor.

6. The process variable transmitter of claim 1, wherein the terminal connectors provide an electrical connection to a two-wire process control loop.

7. The process variable transmitter of claim 3, including a screw configured to secure an electrical connection to the screw assembly.

8. The process variable transmitter of claim 1, wherein the process variable sensor comprises a temperature sensor.

9. A method for manufacturing a process variable transmitter for use in industrial process, comprising:
molding a process variable transmitter polymer housing having a cavity formed therein and including a polymer wall which forms an integrated terminal block formed as a single piece with the housing and the polymer wall divides the cavity into a first compartment and a second compartment and provides a seal therebetween;
providing a terminal screw assembly which is molded into the polymer wall and extends through the integrated terminal block;
providing a terminal pin electrically connected to the terminal screw assembly which is molded into the polymer wall which provides an electrical connection which extends through the integrated terminal block from the first compartment to the second compartment, wherein a portion of the terminal pin in the first compartment extends from the polymer wall and is exposed in the first compartment and a portion of the terminal pin in the second compartment extends from the polymer wall and is exposed in the second compartment;
placing measurement electronics in the first compartment and electrically coupling the measurement circuitry to the terminal screw assembly through the terminal pin in the first compartment; and
coupling a process variable sensor to a terminal screw assembly in the second compartment, the terminal screw assembly electrically coupled to the electrical connection which extends through the integrated terminal block.

10. The method of claim 9, wherein the measurement circuitry couples to a two-wire process control loop through the electrical connection using the terminal screw assembly in the second compartment.

11. The method of claim 9, wherein the electrical connection comprises a terminal pin.

12. The method of claim 11, including securing the terminal screw assembly with a prong which extends into the integrated terminal block to thereby afix the terminal screw assembly to the integrated terminal block.

13. The method of claim 9, wherein the process variable sensor comprises a temperature sensor.

14. The method of claim 9, including sealing the first and second compartments with end caps.

15. The method of claim 9, including coupling a process control loop to terminal connectors in the second compartment.

\* \* \* \* \*